Oct. 10, 1967   J. E. HAWKINS   3,346,064
METHOD AND APPARATUS USING HIGH VELOCITY IMPACT IN THE
EXPLORATION OF SUBSURFACE EARTH FORMATIONS
Filed Jan. 31, 1963   2 Sheets-Sheet 1
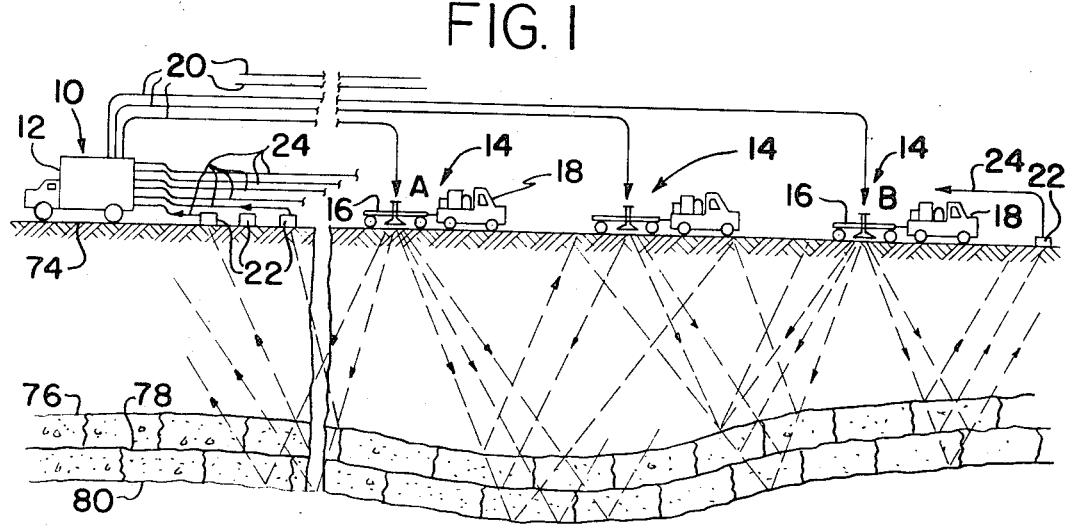
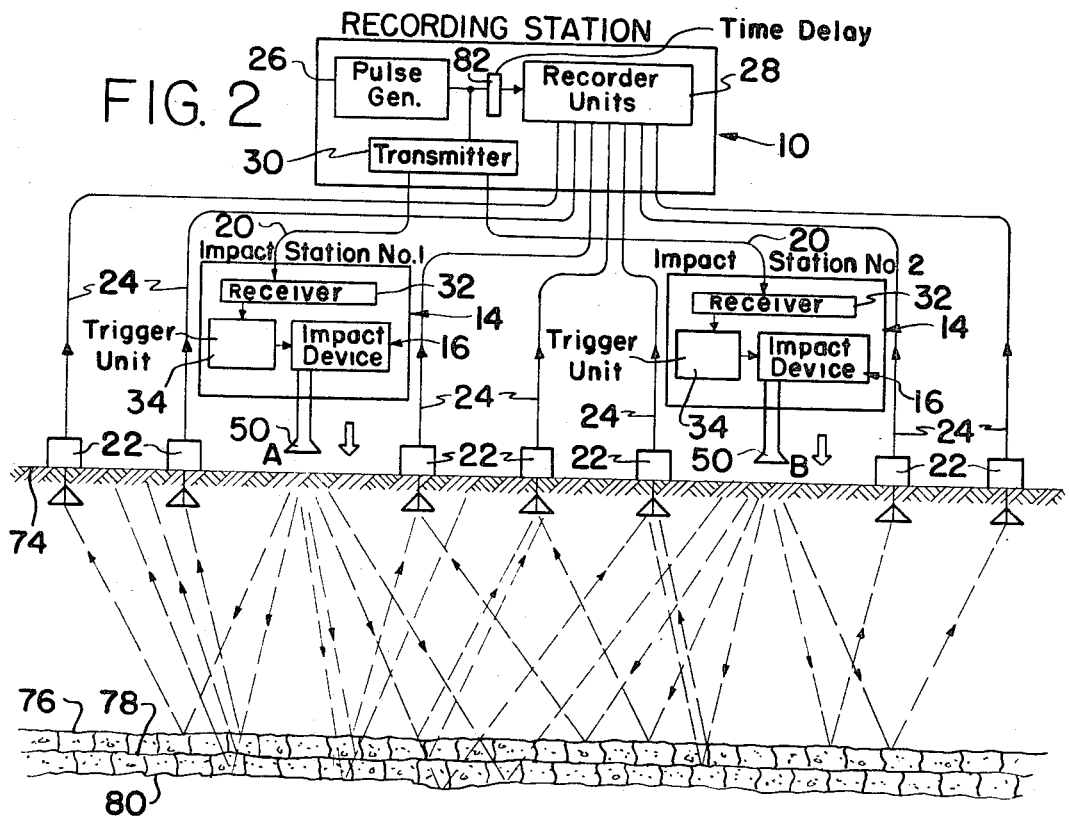
INVENTOR.
JAMES E. HAWKINS
ATTORNEYS Oct. 10, 1967   J. E. HAWKINS   3,346,064
METHOD AND APPARATUS USING HIGH VELOCITY IMPACT IN THE
EXPLORATION OF SUBSURFACE EARTH FORMATIONS
Filed Jan. 31, 1963   2 Sheets-Sheet 2

INVENTOR.
JAMES E. HAWKINS
BY Mason, Kolehmainen,
Rathburn & Wyss
ATTORNEYS

United States Patent Office 3,346,064
Patented Oct. 10, 1967

3,346,064
METHOD AND APPARATUS USING HIGH VELOCITY IMPACT IN THE EXPLORATION OF SUBSURFACE EARTH FORMATIONS
James E. Hawkins, Broken Arrow, Okla., assignor to Seismograph Service Corporation, Tulsa, Okla., a corporation of Delaware
Filed Jan 31, 1963, Ser. No. 255,309
25 Claims. (Cl. 181—0.5)

The present invention relates to a method and apparatus for exploring subsurface earth formations and is more particularly concerned with a new and improved method and apparatus for generating seismic waves in the earth and detecting and recording those waves that are reflected from interfaces between various subsurface earth formations.

One of the presently used methods for exploring subsurface earth formations involves dropping a large weight (usually several tons) from a predetermined distance above the earth's surface (usually 6 to 12 feet) to strike the earth with an impact in order to create seismic waves. These waves pass downwardly through the earth formations and are detected and recorded after upward reflection from various interfaces between the formations.

One of the principal problems encountered in the weight dropping method is that of variation in travel distance and time of the weight as it is dropped. For instance, if a weight is dropped from approximately nine feet above the surface, a variation in this distance of four inches will cause a variation in travel time of approximately 14 milliseconds; travel time being the time lapse from the instant of releasing the weight until the instant when the seismic waves are created in the ground. Unless precise and uniform dropping heights are attained the records made from successive drops will have reflected wave signal out of phase so that these records are of marginal value in studying the subsurface earth formations.

Obtaining uniform dropping times on successive drops of the weight is difficult to accomplish practically because of irregularities of the earth's surface at the various impact points and also because of variations in compaction of the different types of soil or crust formations present at the various dropping locations.

Another disadvantage of the weight dropping method is that by merely dropping a weight of several tons, for example, from a predetermined height, a relatively small amount of energy is imparted to the earth by the impact and, as a result, extremely sensitive detecting devices must be used to obtain useful information from the reflected waves. In many instances, even with extremely sensitive detection devices, a useful recording cannot be obtained because of the limited amount of energy imparted to the earth by a single weight drop. Obviously, more energy could be created if several weights were dropped simultaneously but this is not practical because of the variations in travel times encountered in the field which make it very difficult to control and synchronize the dropping of a plurality of weights at precisely the right time so that their impacts with the earth will be simultaneous. Thus, it has been found necessary in prior art systems to drop the weight several times at the same point or at least in the same vicinity and to make a reproducible record of the energy arriving at one or more detectors in response to a drop. This recording then can be played back in time correlation with the signals arriving from the next drop so that the sets of signals can be added together or composited and recorded to produce a single record in which the in-phase energy corresponding to the waves reflected from the subsurface interfaces is accentuated, while the random noise is attenuated. This operation may be repeated on successive drops until a useful record is obtained. Alternatively, the signals detected for the different drops may be individually recorded in reproducible manner so that all of them can be played back simultaneously to develop signals which may be composited to obtain a single record. However, in either case, in order for the reflected energy to be composited in-phase it is essential that corrections be introduced either during recording or during playback to compensate for any time variations caused by the differences in travel times of the weight during the different drops. Without this compensation the reflected energy will not be in-phase and it too will be attenuated so that useful information cannot be recognized. In order to obtain a parameter to permit the proper corrections to be made, it has been found necessary to measure the drop time of the weight for each drop, thus requiring expensive equipment which is subject to error. Morever, the appartus for introducing the time corrections after the drop time measurements have been made is complicated and expensive and, in addition, due to this complexity it too is subject to some error.

Therefore, it is a primary object of the present invention to provide a new and improved method and apparatus for exploring subsurface earth formations which eliminates or greatly reduces the disadvantages of the present weight dropping method.

More particularly, it is an object of the present invention to provide a new and improved method and apparatus for exploring subsurface earth formations and utilizing an impact device for generating seismic waves by means of a high pressure fluid acting to move a foot or striker against the earth with a high impact velocity to impart high quantities of energy to the earth, thus producing seismic waves of sufficiently high intensity that detection and recording of reflections of the waves from various subsurface earth formations can be readily accomplished.

The invention has for another object the provision of a new and improved method and apparatus for use in seismic exploration wherein a plurality of successively applied impacts create seismic waves for reflection from subsurface interfaces to a detecting station where the seismic waves are converted to electrical signals for recording so that the records may be played back to permit compositing either with signals subsequently developed by the detectors or with other playback signals, the compositing being accomplished without introducing time corrections to compensate for impact time differences and also without requiring measurement of the time interval between actuation of the impact device and generation of the seismic waves.

A further object of the present invention is to provide a new and improved method and apparatus for seismic exploration of the type described wherein the time interval between actuation of the impact device and the actual production of seismic waves in the earth is relatively constant despite variations in the earth's topography at various impact locations and irrespective of the soil conditions at these locations.

Another object of the present invention is to provide a new and improved method and apparatus for seismic exploration wherein a plurality of impact devices at different locations may be controlled to strike the ground at precisely the same instant so that the seismic waves from the several impact devices are created simultaneously to produce a combined effect which can be readily detected at one or more detecting stations without resort to highly sensitive detecting devices or to laborious and time consuming compositing techniques.

Still another object of the present invention is to provide a new and improved method and apparatus for seismic exploration wherein an impact device of the type described strikes the earth with a foot or striker traveling at a velocity approximately equal to the velocity of propagation of the seismic waves in the earth, thus effecting a more efficient energy transfer from the impact device to the earth.

The invention also has for an object the provision of a new and improved method and apparatus for seismic exploration wherein a plurality of impact devices can be actuated simultaneously to strike the earth in order to create seismic waves, the time intervals between the actuation and the actual creation of the seismic waves being substantially uniform so that the seismic waves effectively combine to produce a large seismic disturbance.

A still further object of the present invention is to provide a new and improved method and apparatus for seismic exploration wherein a pulse generator is used to trigger one or more impact devices of the type described and also ot start a recorder in operation to record the various signals received by one or more detecting devices receiving the seismic waves reflected from the subsurface earth formations.

Yet another object of the invention is to provide a method and apparatus for seismic exploration using a downwardly moving weight striking the earth to create seismic waves wherein the time interval between initiation of the downward movement and the actual generation of the seismic waves in the earth is substantially constant so that this time interval, once known, can be used in computation of travel times or depths of formations from the final seismic records without resort to measurement of this time interval for each weight drop.

The invention has for another object the provision of a new and improved method and apparatus for seismic exploration wherein the time interval between successive impacts is greatly reduced to facilitate making a large number of recordings during a relatively short period of time.

The invention has for a further object the provision of a new and improved apparatus for seismic exploration characterized by simplicity of construction and operation, easy transportability, rapidity of operation and economy, both in initial cost and in subsequent operation.

Briefly, in the practice of the present invention, means are provided for generating a synchronizing signal or pulse and for using the pulse both to initiate operation of a recorder and to actuate one or more impact devices for striking the earth to create seismic waves therein. Each of the impact devices is provided with a high density medium, such as a foot or striker, which is movable through a predetermined distance at high velocity to strike the earth. Each impact device operates in response to the synchronizing pulse in such manner that very little time elapses between the time the pulse is sent out and the actual impact of the striker with the ground with the result that this time interval is substantially constant irrespective of variations in earth topography or soil conditions.

One or more detectors are positioned on the earth's surface for receiving the seismic waves that are reflected towards the surface after reflection from the various interfaces between subsurface formations. Each detector converts the seismic waves into corresponding electrical signals which may be transmitted to the recorder for recording. The operation of the recorder is initiated by the synchronizing signal so that this operation is synchronized with that of the impact devices. The signals from each detector are recorded reproducibly as a function of time so that they can be played back and re-recorded in visual form either with or without compositing. If they are recorded directly, the time between the synchronizing pulse and the arrival of the reflected wave from a given interface can be measured directly from the record. Moreover, if the velocities of propagation of the seismic waves through the formations involved are known or if they can be computed in conventional manner, i.e., by velocity logging a borehole in the area being surveyed, the depth of the interface from which the reflections are received can be easily determined. Since there is a time interval between the synchronizing signal and the actual generation of the seismic waves this parameter must be subtracted from the measured travel times on the record to obtain the true travel time but, since this parameter is substantially constant, it need not be measured for each impact. If a compositing technique is employed several reproducible recordings, either in the form of separate records or as separate traces on the same record, can be played back simultaneously and in time correlation so that the signals reproduced from the several recordings can be added together algebraically with the results described above. Alternatively, the compositing may be accomplished by playing back the recording made from signals arriving from a first impact in time correlation with the arrival of signals at the detectors from a second impact so that the two sets of signals may be added together. This process may be repeated several times if necessary until a record is obtained on which the reflected wave signals can be readily recognized. However, regardless of the compositing technique employed, it is unnecessary to measure the drop times or to introduce time corrections to compensate for any variations in these times since any such variations will have negligible effect on the compositing.

An impact device of the type used in the practice of the present invention is capable of applying relatively large energy to the earth, both because of an increase in kinetic energy of the weight due to the much higher impact velocity than that of a freely falling weight and also because of the much better transfer of energy between the moving weight and the earth as the velocity increases. Thus, it has been found that a marked increase in energy results when the velocity of the weight approaches the velocity of propagation of the earth formation which it strikes. This means that a high velocity impact device of the same weight as a freely falling body will produce much greater seismic energy and, as a result, the size and weight of the impact device can be considerably reduced, if desired, while still producing the same seismic energy as a much larger freely falling weight. Alternatively, a single high velocity impact device may be capable of developing sufficient seismic energy under favorable conditions to permit direct detection of the reflected waves without resort to compositing. If a single impact device is unable to supply sufficient energy under adverse conditions several such devices may be used to develop a very large combined seismic disturbance. These several devices can be actuated simultaneously by the synchronizing signal and, since their travel times between actuation and creation of the seismic waves are substantially uniform, the seismic waves resulting from all of the impacts will be in-phase so that they effectively combine. This result cannot be achieved by using several weights dropped simultaneously because the travel times of these weights differ so significantly that the seismic waves created are out of phase and will not combine.

The invention, both as to its manner of operation together with other objects and advantages, will best be understood by reference to the following detailed description and claims when considered in conjunction with the accompanying drawings wherein:

FIG. 1 is a diagrammatic view showing a fragmentary section of the earth's surface together with apparatus characterized by the features of the present invention for seismic exploration of the earth's subsurface formations;

FIG. 2 is a view similar to FIG. 1 with the apparatus of FIG. 1 being illustrated in schematic form;

FIG. 3 shows a series of waveforms which are useful in understanding the operation of the various components of the apparatus of the present invention; and FIG. 4 is a side elevational view, partly in section, of an impact device used in the present invention.

Referring now to the drawings, a system for seismic exploration of subsurface earth formations is illustrated in FIGS. 1 and 2 and comprises a recording station 10 and one or more impact stations 14. The recording station 10 is preferably portable and, to this end, is carried in a truck or van 12 (FIG. 1). Electrical power for operation of the recording station 10 is usually obtained from a diesel or gasoline generator system (not shown) which is also carried on the truck 12.

Each of the impact stations 14 includes an impact device 16 which is generally pulled by a vehicle 18 in order that the station can easily be moved from place to place. Each of the vehicles 18 also carries other apparatus for operating the associated impact station which apparatus will be described more fully hereinafter. The recording station 10 may be connected to the various impact stations 14 by means of cables 20 which carry a plurality of conductors but preferably the control of this station is effected by means of radio signals.

There are also placed at various desired locations around the impact stations 14 a plurality of detectors or geophones 22. These detectors 22 are of conventional type and respond to seismic energy detected at the earth's surface by converting this energy into corresponding electrical signals. These electrical signals are preferably amplified and transmitted to the recording station 10 by means of multiconductor cables 24 since the detectors are usually located close together and in the same vicinity as the truck 12.

In the form illustrated, the recording station 10 comprises a pulse generator 26 of conventional construction for producing a synchronizing pulse 26a (see FIG. 3a) which may be of any desired pulse height, duration and wave form, but is illustrated as a square or rectangularly shaped wave. As will become apparent from the ensuing description it is not essential that the synchronizing pulse be generated at the recording station since it could also be developed at one of the impact stations 14 or even at a point remote from both the recording station and all of the impact stations. The pulse 26a is fed to a recorder unit 28 to initiate the operation of the latter and is also fed to a transmitter unit 30 where it is used to key the transmitter to produce a signal burst of about the same duration as the pulse 26a but of high frequency, as indicated by the waveform 30a in FIG. 3. The amplified high-frequency signal burst may be radiated from the transmitter unit 30 to a plurality of receivers 32 one of which is located at each impact station 14. Alternatively, the synchronizing pulse may be sent to the impact stations by means of the multiconductor cables 20 but this is not usually desirable because of the difficulty in handling the cable and stringing it through areas which are often characterized by rough terrain or heavily wooded or marsh regions.

At each impact station 14, the receiver 32 rectifies the signal burst and amplifies it to sufficient intensity to produce a waveform of the type indicated at 32a in FIG. 3 for driving a trigger unit 34. Each of the trigger units 34 can be of the monostable multivibrator type and, when triggered by the rectified signal from the associated receiver, produces a square wave pulse 34a of the proper amplitude and duration for actuating its impact device 16.

One of the impact stations 14 is illustrated in greater detail in FIG. 4 of the drawings where it can be seen that the components making up the impact device 16 are carried on a trailer 36 pulled by the vehicle 18. Preferably, the receiver unit 32 and the trigger unit 34 are carried on the vehicle 18 along with an air compressor 38 and its driving prime mover 40 which may be a diesel or gasoline engine. The primer mover 40 may also drive a generator (not shown) for supplying the necessary electrical power to operate the receiver and trigger units.

The air compressor 38 is of the multistage type and provides a source of high-pressure air (approximately 2,000 p.s.i.) and low-pressure air (approximately 200 p.s.i.) for operating the impact device 16. In addition, storage tanks and relief valves (not shown) are provided to maintain a ready supply of both high-pressure and low-pressure air.

The impact device itself comprises a large, vertically extending cylinder 42 mounted on the trailer 36 and having a piston 44 therein connected to a piston rod 46 extending downwardly from the lower end of the cylinder. A heavy foot or striker 50 is attached to the lower end of the piston rod 46 by means of a ball and socket joint 48. The striker 50 is adapted to be driven downwardly at very high velocity by the piston 44 to strike the earth's surface in order to create a seismic wave. The foot 50 is preferably constructed of heavy steel plate or other high density material and is provided with stiffening ribs attached to the ball member of the ball and socket joint 48 in order to distribute the load on impact throughout the plate. The ball and socket joint 48 reduces the side loads which would be imposed on the piston rod and piston when the foot strikes an irregular or varying ground surface. In addition, there are provided at least four uniformly distributed air springs 52 or damper units which have their lower ends pivotally attached to the striker 50 adjacent the peripheral edges thereof. The upper ends of the air springs are pivotally attached to the frame of the trailer 36. The air springs 52 tend to level the foot 50 as it is moved relative to the ground which action also reduces the side loads on the piston and piston rod and provides a means for stabilizing the foot 50 against sway when the impact unit is pulled from place to place during field operations. In addition, when the unit is to be moved to a different location hook means (not shown) are provided to connect the foot 50 to the trailer frame, thereby to alleviate the load upon the cylinder 42 and air springs 52.

The cylinder 42 has a fixedly positioned orifice plate 54 positioned adjacent its mid portion and dividing the cylinder into an upper chamber 56 and a lower chamber 58. The orifice plate 54 has a central opening or orifice 60 therein of considerably smaller diameter than the cylinder itself. The upper surface of the orifice plate 54 around the orifice 60 is tapered inwardly as indicated at 62 to provide a rapid non-turbulent flow of fluid from the upper chamber 56 into the lower chamber 58.

The upper surfaces of the piston 44 carries a sealing means such as an O ring 64 which is concentric with and slightly larger than the orifice 60. Thus, when the piston 44 is in its uppermost position of travel, as shown in FIG. 4, the O ring 64 is compressed tightly between the lower surface of the orifice plate 54 and the upper surface of the piston 44, thereby providing a seal. As long as this seal is maintained, air under pressure in the upper chamber 56 exerts force upon the relatively small area on the upper surface of the piston 44 defined by the O ring 64 while air under pressure in the lower chamber 58 exerts force on the relatively large surface on the underside of the piston 44. Consequently, the upper chamber 56 can be pressurized to a relatively high pressure (approximately 2,000 p.s.i.) while the lower chamber 58 can be pressurized to a relatively low pressure (such as 200 p.s.i.) without moving the piston 44 from the uppermost position and as long as the upward force on the piston overbalances the downward force the piston cannot move. The permissible pressure difference between the two chambers before the piston moves is obviously a function of the respective areas of the piston exposed to the two chambers. If the air in the lower chamber 58 is vented to the atmosphere or reduced momentarily the downward force slightly overbalances the upward force and the piston 44 moves downwardly slightly to break the seal of the O ring 64 so that almost instantaneously the high pressure in the upper chamber 58 acts on the entire upper surface of the piston 44 and greatly overbalances the upwardly directed force. The piston and the foot 50 are thus driven rapidly downward to strike the earth and generate seismic waves therein. The striker 50 is thus accelerated from rest at a rate much greater than the acceleration due to gravity of a free falling weight which is merely released or dropped.

In actual practice, with an impact device of the type described, it has been possible to obtain outputs of impact energy in the neighborhood of 75,000 ft. lbs., utilizing upper chamber pressures of approximately 2,000 p.s.i. In comparison, a weight dropped from a height of 9 feet (disregarding air friction) and allowed to fall freely will strike the ground at a velocity of 24.1 feet per second or 289 inches per second, as determined by the equation $V=\sqrt{2gD}$, where V represents velocity, g represents the acceleration due to gravity and D represents the distance of the drop. Dropping heights of this magnitude are, of course, essential to develop sufficient seismic energy. With an impact device like that shown in FIG. 4 having a 12 inch piston stroke, terminal velocities several times 24 feet per second can be obtained.

It is a known fact that in the operation of a weight dropping system of the type described, for example, in U.S. Patents Nos. 2,851,121 and 2,851,122, it is desirable to move the weight carrying truck or vehicle between successive drops by such distance that the horizontally travelling waves from the successive drops are so far out of phase upon arrival at the detectors that they fail to combine additively during compositing or integration and, as a matter of fact, often cancel each other or at least combine to attenuate the final composited signal. At the same time, the amount of truck movement is so small that the reflected waves from successive drops arrive at the detectors at approximately the same time lapse following the drop so that these reflected waves additively combine or integrate effectively during compositing. By integrating a large number of records or successively arriving waves in the manner described it is possible to eliminate or severely attenuate the natural earth disturbances and the horizontally travelling waves.

As is described in detail in U.S. Patent No. 2,851,121 referred to above, the integration or compositing process is ineffective if the reflected waves are greater than 90° out of phase. Assuming that the frequency of the seismic waves is about 35 cycles per second, a common value, a 90° phase shift is equal to about 7 milliseconds in time.

For reasons which are described above and also in U.S. Patent No. 2,851,121 the actual distance through which the weight falls frequently varies under field conditions by as much as five or six inches. When utilizing a free falling weight, a variation of four inches in a dropping distance with a nine foot mean will cause a variation in dropping time of approximately 14 milliseconds. As a result, reflected waves appearing on records produced from successive drops by this method will be greatly out of phase even with relatively minor variations in the travel distance of the weight. This means that, during recording playback and compositing of the records produced from the weight drops, time corrections of significant value must be introduced to compensate for even minor variations in dropping of the weight. In the practice of the weight dropping method the time interval between the drop and the generation of the seismic waves must be measured to obtain the proper parameter to make the described corrections with the result that both the measurement and the step of introducing the corrections constitute probable sources of error which impede the analysis and interpretation of the final record. As contrasted with this prior art method, the foot 50 of the impact device 16 of the present invention causes a variation of only two milliseconds of time if the drop distance varies as much as four inches with the result that signals appearing upon recordings made from successive or simultaneous impacts utilizing this device will be cosely phased and readily usable without time correction during playback. In this connection, it should be observed that a two millisecond time difference does not seriously affect the phase relationship between signals recorded from successive impacts and, as a result, no time corrections are necessary. For reasons described fully above, it has been found that a time difference of more than 7 milliseconds introduces sufficient phase shift to require correction and, since time differences of this amount are common in the weight dropping method as a result of normal variations in topography and soil conditions, the latter method cannot be used without making the time measurements and corrections in the manner described. In the method and apparatus of the present invention the striker 50 is moved at such high velocity that time differences of less than 5 milliseconds exist even under the most extreme conditions of soil and topography. This is accomplished by accelerating the striker so rapidly that impact velocities greater than 67 feet per second are obtained and, hence, this rapid acceleration is an important feature of the present invention.

Another advantage of the high velocity impact utilized in the present invention as compared with the weight dropping system is that if the weight of the foot 50 is equal to that of a free falling weight the amount of energy imparted to the earth will be much greater because of the increased impact velocity. It has been found that greater energy is available from the impact device 16 not only because of the increased kinetic energy which is proportional to the square of the velocity but also because the transfer of energy from the foot or striker to the earth is much more efficient than that obtained by merely dropping a weight which attains only a relatively low impact velocity. More specifically, it has been found that at impact velocities approaching the velocity of propagation of seismic waves in the earth formations the transfer of energy or coupling is markedly increased. The increase in energy imparted to the earth by the impact device 16 results in the creation of seismic waves of sufficient intensity that recordings can be made with less sensitive detecting equipment, or, in the alternative, a useful record can be made without resort to compositing of signals played back from a large number of records. Alternatively, the size and amount of the weight can be greatly reduced (over that of a free falling weight) while still obtaining results comparing favorably with those obtained from a system using a free falling weight.

The impact device 16 is operated by the compressed air which is supplied from the compressor 40 to the cylinder 42 via a piping and valve system shown schematically in FIG. 4. To this end, the upper chamber 56 of the cylinder 42 is connected to the high pressure air tank by means of a conduit or pipe 66 in which an electrically operated solenoid valve 68 is placed while the lower chamber 58 is connected to the low pressure air tank by means of a conduit or pipe 70 in which another electrically operated solenoid valve 72 is placed. The solenoid valves 68 and 72 are electrically connected to the trigger unit 34 by means of electrical cables 74. The low pressure valve 72 is normally deenergized and when in this position low pressure air from the low pressure tank passes through the line 70 into the lower chamber 58 where it exerts an upward force on the piston 44 tending to raise the piston and hold it in sealed relation against the orifice plate 54 as described above. When the solenoid valve 72 is energized by the pulse 34a from the trigger unit 34 it opens and remains open throughout the duration of the pulse and then returns automatically (by means of a spring, for example) to its normal position at the end of the pulse. When the solenoid is energized the valve 72 shuts off the flow of low-pressure air from the line 70 to the lower chamber 58 and vents the lower chamber to permit escape of air through the exhaust port 72a, thus abruptly removing the upwardly directed force on the piston and allowing the high-pressure air in the upper chamber 56 to force the piston and foot rapidly downward to strike the ground.

The duration of the pulse to the solenoid valve 72 is greater than the length of time required for the piston 44 to complete its stroke (i.e., to move from the uppermost position until the foot 50 strikes the ground) so that the full effect of the high pressure air in the upper chamber will be realized. At the end of the pulse the valve 72 is deenergized and the lower chamber 58 is again connected to the source of low-pressure air for lifting the piston and foot to the uppermost position in readiness for the next impact.

The high-pressure valve 68 is similar to the valve 72 and, when in its normal or deenergized condition, connects the upper chamber 56 to the source of high-pressure air through the line 66. When the solenoid of this valve is energized, the valve shuts off the flow of high-pressure air to the upper chamber 56 and vents the chamber to the atmosphere through an exhaust port 68a. The valve 68 is also energized by a pulse 34b (FIG. 3) from the trigger unit for a predetermined period. The pulse 34b is initiated at the end of the pulse 34a by suitable circuitry within the trigger unit which circuiting may include a second, multivibrator triggered by a spike or pulse developed by the trailing edge of the pulse 34a.

Assuming that the piston 44 is in the position shown in FIG. 4 ready for the impact stroke with high pressure in the upper chamber 56 and low pressure in the lower chamber 58, when the pulse 34 is applied to the valve 72 the lower chamber is abruptly vented to atmosphere and the upwardly directed force on the piston 44 is reduced so that the piston is moved out of sealing relation with the orifice plate 54 by the high pressure air in the upper chamber 56. When this happens, the high-pressure air in the upper chamber flows through the orifice 60 and almost instantaneously acts upon the entire upper surface of the piston to drive the piston rapidly downwardly until the foot 50 strikes the ground. The time duration between the leading edge of the pulse 34a and the actual impact of the foot with the ground is relatively constant for each impact despite variations in the ground level and irrespective of the soil conditions. Variations in operating times of the solenoid valves of various units can be compensated for by adjusting the working pressures in the chambers of the units, but it has not been found necessary to make such adjustments because valve operating times are fairly uniform for production valves of the same model.

At the end of the pulse 34a, the valve 72 returns to its normal position again connecting the low pressure air source to the lower chamber 58. At this time, the pulse 34b is produced to energize the valve 68 in order to vent the upper chamber 56 to the atmosphere and to permit the piston 44 to return upwardly to the position shown in FIG. 4. The duration of this pulse 34b is greater than the time required for the piston to be returned to the uppermost position. The valve 68 is deenergized at the trailing edge of the pulse 34b to admit high-pressure air to the upper chamber 56. Since the upward force on the piston is slightly greater than the downward force, as previously discussed, the piston remains in the position of FIG. 4 until the beginning of the next cycle when the valve 72 is energized.

Referring now to FIGS. 1 and 2, the seismic waves created in the earth's surface 74 at each impact station travel downwardly and outwardly in many directions as indicated by the arrow pointed broken lines. The waves produced by each impact device are more generally vertical than horizontal because of the vertical direction of travel of the striker 50, thus reducing or eliminating many of the undesirable characteristics of horizontal waves or refractions which obscure the useful information derived from the waves reflected from the subsurface interfaces being explored.

When the generally downwardly directed seismic waves impinge upon interfaces between the earth's subsurface strata, such as indicated at 76, 78 and 80, part of the energy of these waves is reflected upwardly toward the earth's surface. The depth and orientation of these interfaces is thus determined by a knowledge of the acoustic properties or velocity of propagation of the various layers and by accurately measuring and recording the time interval between the impact and the arrival of the reflections at the detectors 22.

The reflected waves are thus detected and converted into corresponding electrical impulses at the detecting stations 22 placed at various known locations relative to the impact stations 14. The waveform 22a shown in FIG. 3 represents an electrical signal produced by a single detector in response to the arriving seismic waves. The large spike 22b at the left end of the waveform 22a represents the time break which occurs at a substantially fixed time following the leading edge of the synchronizing pulse 26a and the smaller variations to the right thereof represent the reflections, refractions and random noises picked up by the detector. These electrical signals are amplified and applied to the recorder unit 28 to produce a reproducible record which may be a magnetic recording or any other conventional form wherein the signals arriving at the detector are recorded as a function of time. The recorder unit may produce separate traces or signal tracks from the signals respectively produced by the different detectors 22. If the recorded signals corresponding to the reflected waves are of sufficient strength the reproducible records may be played back to develop electrical signals for use in producing visible records. The travel times of the reflected waves may then be taken from the record by reference to the time break and to the time of arrival of these waves at the detector. The depth of each interface can be computed from these travel times if the velocities of propagation of the subsurface formations are known or can be measured. If the travel times taken from the record are measured with a time break beginning with the leading edge of the pulse 26a they will include an increment equal to the drop time between actuation of the impact device 16 and the instant of generation of the seismic waves. Thus, the times on the record represent this increment plus the true travel time of the seismic waves from the point of impact down to the interface and back to the detector at the surface.

Since the increment referred to above is substantially constant and since any variation has negligible effect on the total travel time being measured, the true travel time can be computed by subtracting this constant from the measured value. In this connection it has been found, for reasons discussed fully above, that variations in drop increment of less than 5 milliseconds are negligible. However, when a weight drop system is used the variations are likely to be considerably above this amount and, as a result, it is necessary to measure each drop increment to provide a parameter for use in making the travel time computations. The present invention avoids the necessity for making such measurements by providing a system wherein the striker is driven at such high velocity that travel time variations are less than 5 milliseconds. Moreover, if desired, the subtraction of the drop increment can be accomplished electronically by passing the spike 26a through a time delay network 82 which introduces a predetermined delay equal to the substantially constant drop increment. The delayed signal from the network 82 may then be used to provide a time break for the traces on each record, which time break coincides with the instant of generation of the seismic waves. The true travel times of the seismic waves may then be taken directly from the record produced by the unit 28 because the effect of the drop time increment has been eliminated by the delay network 82. The network 82 need not be adjusted for any given impact device or for those of identical construction, but, if desired, this network may be made adjustable to permit the recording station to be used with other impact devices having different piston strokes or, more specifically, with any such device having a substantially different drop time increment. The delay network 82 thus eliminates the necessity for making mental computations to convert measured travel times to true travel times.

If the reflected wave signals or the records or traces produced by the unit 28 are weak and are obscured by the random noise so that they are difficult to recognize, several reproducible records may be made from successive impacts and the resulting signals may be played back and composited to produce a single record for final recording. Since the time interval between the beginning of the pulse 26a and the actual impact of the foot is easily determined and is substantially constant for each impact, the individual reproducible records will not require time correction to compensate for impact travel time differences. The signals developed during playback can be composited directly without such time corrections. If the delay network 82 is used the drop time increments will be effectively eliminated from the final record. During playback and/or recording the corrections such as those for weathering, elevation of detectors and impact point, spread effect of the detectors, etc., can be introduced but these form no part of the present invention and, since they are well known, they will not be described in detail. Thus, the method and apparatus of the present invention avoids the necessity for measuring the travel time of the impact device and it also avoids the laborious and time consuming operation of correcting for impact travel time differences. Moreover, the equipment of the present invention is much less complex than that of the prior art and the operation of this equipment is much simpler.

In practice with the system of the present invention, it is possible to initiate successive impacts at intervals as low as 5 to 10 seconds apart with the result that the number of seismic soundings which can be accomplished in a given period is considerably greater than with prior art devices. Moreover, the system provides a means for simultaneous generation of seismic waves at a plurality of different impact stations in the same general vicinity to create a seismic disturbance of such magnitude that a single recording can be made, thus avoiding resort to the prior art procedure described above where several records are recorded, played back and composited. Thus, the method and apparatus of the present invention represents a distinct improvement over the slow, cumbersome and inaccurate weight drop procedure now being used. The ability to trigger several impact stations simultaneously is made possible by the substantially constant time interval between the energization of the valve 72 and the actual impact of the foot 50 with the ground. Thus, if several impact stations are employed they may all be triggered simultaneously in the manner described above so that the strikers 50 of all stations will hit the ground at approximately the same time to create a combined seismic wave of high magnitude. This result cannot be achieved with several weight drops due to the non-uniform and relatively large delay time between the start of the drop and the actual impact. The difference in such delay times between various drops is likely to cause cancellation of much of the seismic energy so that the beneficial results which are possible with the present invention cannot be achieved. In this connection, it has been found that two weights having drop times varying by 7 milliseconds or more develop seismic waves which do not combine effectively. In accordance with an important feature of the present invention the impact devices are driven at such high velocity that the maximum difference in drop time is less than 5 milliseconds so that the seismic waves resulting from all impacts can be effectively combined.

While several embodiments of the invention have been shown and described, it will be understood that many changes and modifications will readily occur to those skilled in this art, and it is, therefore, intended in the appended claims to cover all such changes and modifications which fall within the true spirit and scope of the present invention.

What is clamed as new and desired to be secured by Letters Patent of the United States is:

1. A method for exploration of subsurface earth formations comprising the steps of striking the earth's surface with a high-density medium at an impact velocity of at least 67 feet per second to create seismic waves, and detecting said seismic waves at a point oriented at a predetermined location relative to the striking point after reflection of said waves from subsurface earth formations.

2. A method for exploration of subsurface earth formations comprising the steps of striking the earth's surface with a high-density medium at an impact velocity of about 67 feet per second or greater to create seismic waves, and detecting said seismic waves at a point oriented at a predetermined location relative to the striking point after reflection of said waves from subsurface earth formations.

3. A method for exploration of subsurface earth formations comprising the steps of: substantially simultaneously striking the earth's surface with high-velocity impacts at a plurality of locations, the impact velocity of each of said impacts being at least substantially as great as the velocity of propagation of the earth which is struck the maximum time variation between all of said impacts being less than 5 milliseconds, so that all of said impacts will effectively combine to produce seismic waves of high amplitude, and detecting said waves after reflection from the subsurface earth formations.

4. A method for exploration of subsurface earth formations comprising the steps of: substantially simultaneously striking the earth's surface with high-velocity impacts at a plurality of locations, the impact velocity of each of said impacts being at least substantially as great as the velocity of propagation of the earth which is struck the maximum time variation between all of said impacts being less than about 5 milliseconds, so that all of said impacts will effectively combine to produce seismic waves of high amplitude and detecting said waves after reflection from the subsurface earth formations.

5. A method for exploration of subsurface earth formations comprising the steps of creating seismic disturbances in the earth by intitiating downward movement of a high-density medium, utilizing said medium to strike the earth at a high velocity, the impact velocity of said medium being at least substantially as great as the velocity of propagation of the earth which is struck, there being a time interval between the initiation and the generation of seismic waves in the earth, the velocity of said medium being such that the time variation in said interval due to variations in earth topography and soil conditons is less than 5 milliseconds.

6. A method of seismic prospecting comprising the steps of creating a seismic disturbance in the earth by initiating downward movement of a high-density medium from rest, imparting sufficient energy to said medium to accelerate it at a rate substantially greater than the acceleration due to gravity acting upon a free falling body, striking the earth with said medium following the acceleration to create seismic waves in the earth, the impact velocity of said medium being at least substantially as great as the velocity of propagation of the earth which is struck and detecting said seismic waves.

7. A method for exploration of subsurface earth formations comprising the steps of creating seismic disturbances in the earth by intiating downward movement of a high-density medium, utilizing said medium to strike the earth at a high velocity, there being a time interval between the initiation and the generation of seismic waves in the earth, the impact velocity of said medium being at least substantially as great as the velocity of propagation of the earth which is struck, the velocity of said medium being such that the time variation in said interval due to variations in earth topography and soil conditions is less than about 5 milliseconds.

8. A method for exploration of subsurface earth formations comprising the steps of generating a series of successive pulses, utilizing each pulse to initiate the downward movement of a high-density medium, utilizing said medium to strike the earth at high velocity to create seismic waves therein upon impact with the earth, there being a time interval between each initiating pulse and its corresponding impact time, the time difference between said time intervals being less than 5 milliseconds, the impact velocity of said medium being at least substantially as great as the velocity of propagation of the earth which is struck, detecting the seismic waves reflected from the various subsurface earth formations as a result of each impact, converting the detected waves from each impact into corresponding electrical signals, and compositing the sets of signals resulting from successive impacts.

9. A method for exploration of subsurface earth formations comprising the steps of: generating a synchronizing pulse; utilizing said pulse to initiate operation of a plurality of strikers utilizing said strikers to substantially simultaneously strike the earth's surface with high-velocity impacts at a plurality of locations, the maximum time variations between all of said impacts being less than 5 milliseconds, so that all of said impacts will effectively combine to produce seismic waves of high amplitude, and detecting said waves after reflection from the subsurface earth formations.

10. A method for exploration of subsurface earth formations comprising the steps of: generating a synchronizing pulse; utilizing said pulse to initiate operation of a plurality of strikers, utilizing said strikers to substantially simultaneously strike the earth's surface with high-velocity impacts at a plurality of locations, the maximum time variation between all of said impacts being less than 5 milliseconds, so that all of said impacts will effectively combine to produce seismic waves of high amplitude, and detecting said waves after reflection from the subsurface earth formations to develop corresponding electrical signals, recording said electrical signals, and utilizing said pulse to initiate the recording operation so as to synchronize it with said impacts.

11. A method for exploration of subsurface earth formations comprising the steps of generating a series of successive pulses, utilizing each pulse to initiate the downward movement of a high-density medium, utilizing said medium to strike the earth at high velocity to create seismic waves therein upon impact with the earth, the impact velocity of said medium being at least substantially as great as the velocity of propagation of the earth which is struck, there being a time interval between each initiating pulse and its corresponding impact time, the time difference between said time intervals being less than 5 milliseconds.

12. A method for exploration of subsurface earth formations comprising the steps of generating a series of successive pulses, utilizing each pulse to initiate the downward movement of a high-density medium, utilizing said medium to strike the earth at high velocity to create seismic waves therein upon impact with the earth, there being a time interval between each initiating pulse and its corresponding impact time, the impact velocity of said medium being at least substantially as great as the velocity of propagation of the earth which is struck, the time difference between said time intervals being less than 5 milliseconds, detecting the seismic waves reflected from the various subsurface earth formations as a result of each impact, converting the detected waves from each impact into corresponding electrical signals, recording said electrical signals, and utilizing each pulse to initiate the recording operation to synchronize it with the impact.

13. In a system for exploring subsurface earth formations the combination of means for generating a synchronizing signal, a plurality of means each rendered effective simultaneously by said signal for striking the earth to generate seismic waves therein substantially simultaneously at a plurality of impact points, each of the last named means including a high-density medium movable through a distance to strike the earth, each of said medium, requiring a time interval between said signal and the generation of its seismic waves in the earth, means for driving each of said mediums at such high velocity that the time intervals vary by less than 5 milliseconds so that the seismic waves from all of the impacts effectively combine to produce a relatively large disturbance, at least one detecting device for detecting the combined seismic waves after passage through the earth formations and for developing therefrom corresponding electrical signals, recording means connected to said detecting device for recording said electrical signals, and means for initiating operation of said recording means in response to said synchronizing signal, whereby said synchronizing signal serves to synchronize the recording with the generation of the seismic waves.

14. In a system for exploring subsurface earth formations the combination of means for generating a synchronizing signal, a plurality of means each rendered effective simultaneously by said signal for striking the earth to generate seismic waves therein substantially simultaneously at a plurality of impact points, each of the last named means including a high-density medium movable through a distance to strike the earth, each of said mediums requiring a time interval between said signal and the generation of its seismic waves in the earth, means for driving each of said mediums at such high velocity that the time intervals vary by less than 5 milliseconds, so that the seismic waves from all of the impacts effectively combine to produce a relatively large disturbance, and at least one detecting device for detecting the combined seismic waves after passage through the earth formations.

15. In a system for exploring subsurface earth formations the combination of means for generating a synchronizing signal, means operated in response to said signal for striking the earth to generate seismic waves therein at an impact point, the last named means including a high-density medium movable through a distance to strike the earth, said medium requiring a time interval between said signal and the generation of its seismic waves in the earth, means for accelerating said medium sufficiently rapidly that the time interval varies by less than 5 milliseconds regardless of the earth topography at the impact point, said driving means including structure for developing an impact velocity of said medium at least substantially as great as the velocity of propagation of the earth which is struck and at least one detecting device for detecting the seismic waves after passage through the earth formations and for developing therefrom corresponding electrical signals, recording means connected to said detecting device for recording said electrical signals, and means for initiating operation of said recording means in response to said synchronizing signal, whereby said synchronizing signal serves to synchronize the recording operation with the generation of the seismic waves.

16. The apparatus defined by claim 15 wherein the recording means is effective in response to said pulse to record a time break signal.

17. In a system for exploring subsurface earth formations the combination of means for striking the earth to generate seismic waves therein at an impact point, the last named means including a high-density medium movable through a distance to strike the earth, said medium requiring a time interval between the initiation of movement of said medium and the generation of its seismic waves in the earth, means for accelerating said medium sufficiently rapidly that the time interval varies by less than 5 milliseconds regardless of earth topography at the impact point, the last mentioned means including structure for developing an impact velocity of said medium at least substantially as great as the velocity of propagation of the earth which is struck and at least one detecting device for detecting the seismic waves after passage through the earth formations.

18. In a system for exploration of subsurface earth formations, the combination of a pulse generating means for generating a plurality of successive pulses, an impact device including a high-density medium downwardly movable through a predetermined, substantially constant distance to strike the earth, control means actuated by said pulse generating means for causing said medium to move downwardly to strike the earth to create seismic waves therein, there being a time interval between the time said control means is actuated by each pulse and the generation of the resulting seismic waves in the earth, said impact device including means for accelerating said medium sufficiently rapidly that said time intervals vary in duration by less than 5 milliseconds irrespective of earth topography or soil conditions, the last mentioned means including structure for developing an impact velocity of said medium at least substantially as great as the velocity of propagation of thte earth which is struck and means for detecting said seismic waves after reflection from subsurface earth formations.

19. In a system for exploration of subsurface earth formations, the combination of an impact device including a high-density medium downwardly movable through a predetermined, substantially constant distance to strike the earth, control means for causing said medium to move downwardly to strike the earth to create seismic waves therein, there being a time interval between the actuation of said control means and the generation of the resulting seismic waves in the earth, said impact device including means for accelerating said medium sufficiently rapidly that said time intervals vary in duration by less than 5 milliseconds irrespective of earth topography or soil conditions, the last mentioned means including structure for developing an impact velocity of said medium at least substantially as great as the velocity of propagation of the earth which is struck and means for detecting said seismic waves after reflection from subsurface earth formations.

20. In a system for exploration of subsurface earth formations, the combination of an impact device having a high-density medium downwardly movable through a predetermined, substantially constant distance to strike the earth to create seismic waves therein, said impact device including means for accelerating said medium rapidly enough to develop an impact velocity of said medium of about 67 feet per second or greater.

21. In a system for exploring subsurface earth formations the combination of means for generating a synchronizing signal, a plurality of wave generating means each rendered effective by said signal to generate seismic waves in the earth substantially simultaneously at a plurality of impact points, means for simultaneously applying said signal to all of said wave generating means, each of the wave generating means including structure for providing its seismic waves in the earth within a time interval following application of said signal, said time intervals varying by less than 5 milliseconds so that the seismic waves from all of the impacts effectively combine to produce a relatively large disturbance, at least one detecting device for detecting the combined seismic waves after passage through the earth formation and for developing therefrom corresponding electrical signals, recording means connected to said detecting device for recording said electrical signals, and means for initiating operation of said recording means in response to said synchronizing signal, whereby said synchronizing signal serves to synchronize the recording with the generation of said seismic waves.

22. In a system for exploring subsurface earth formations the combination of means for generating a synchronizing signal, a plurality of wave generating means each rendered effective simultaneously by said signal for generating seismic waves in the earth substantially simutaneously at a plurality of impact points, means for simultaneously applying said signal to all of said wave generating means, each of said wave generating means requiring a time interval between application of said wave generating signal and the generation of its seismic waves in the earth, each of said means including structure for producing the seismic waves in the earth within a time interval following application of said signal, said time intervals varying by less than 5 milliseconds so that the seismic waves from all of the impacts effectively combine to produce a relatively large disturbance, and at least one detecting device for detecting the combined seismic waves after passage through the earth formations.

23. A method for exploration of subsurface earth formations comprising the steps of generating a series of successive synchronizing signals, utilizing each signal to synchronize the creation of a plurality of impacts spaced horizontally apart and each generating seismic waves in the earth, there being a time interval between each signal and each impact, said time intervals varying by less than 5 milliseconds whereby the seismic waves from all of the impacts effectively combine to produce a large disturbance, detecting the seismic waves reflected from the various subsurface earth formations as a result of said disturbance, converting the detected waves from said disturbance into corresponding electrical signals, recording the electrical signals, and synchronizing the recording with the impacts by using said synchronizing signal.

24. A method for exploration of subsurface earth formations comprising the steps of generating a series of successive synchronizing signals, utilizing each signal to synchronize the creation of a plurality of horizontally spaced impacts each generating seismic waves in the earth, there being a time interval between each signal and each impact, said time intervals varying by less than 5 milliseconds whereby the seismic waves from all of the impacts effectively combine to produce a large disturbance, and detecting the seismic waves reflected from the various subsurface earth formations as a result of said disturbance.

25. In a system for exploring subsurface earth formations the combination of means for generating a synchronizing signal, means operated in response to said signal for striking the earth to generate seismic waves therein at an impact point, the last named means including a high-density medium movable through a distance to strike the earth, said medium requiring a time interval between said signal and the generation of its seismic waves in the earth, means for driving said medium at such high velocity that the time interval varies by less than 5 milliseconds regardless of the earth topography at the impact point, and at least one detecting device for detecting the seismic waves after passage through the earth formations and for developing therefrom corresponding electrical signals, recording means connected to said detecting device for recording said electrical signals, means for initiating operation of said recording means in response to said synchronizing signal, whereby said synchronizing signal serves to synchronize the recording operation with the generation of the seismic waves, said recording means being effective in response to said pulse to record a time break signal and delay means for delaying the recording of said time break signal following said pulse for a period substantially equal to said time interval.

References Cited

UNITED STATES PATENTS

| | | | |
|---|---|---|---|
| 3,012,625 | 12/1961 | Piety | 181—.5 |
| 3,029,894 | 4/1962 | Parr | 181—.5 |

(Other references on following page)

References Cited

UNITED STATES PATENTS

| | | | |
|---|---|---|---|
| 3,088,094 | 4/1963 | Heintz et al. | 346—74 |
| 3,198,282 | 8/1965 | Dunaway | 182—.5 |
| 3,189,121 | 6/1965 | Vander Stoep | 181—.5 |
| 2,642,146 | 6/1953 | Woods | 181—.5 |
| 2,745,507 | 5/1956 | Bodine | 181—.5 |
| 3,209,854 | 10/1965 | Williams | 181—.5 |
| 3,215,223 | 11/1965 | Kirby et al. | 181—.5 |
| 3,249,177 | 5/1966 | Chelminski. | |

FOREIGN PATENTS

| | | |
|---|---|---|
| 962,850 | 7/1964 | Great Britain. |

BENJAMIN A. BORCHELT, *Primary Examiner.*

W. KUJAWA, *Assistant Examiner.*